US009489768B2

(12) United States Patent
Bao et al.

(10) Patent No.: US 9,489,768 B2
(45) Date of Patent: Nov. 8, 2016

(54) SEMANTIC DENSE 3D RECONSTRUCTION

(71) Applicant: NEC Laboratories America, Inc., Princeton, NJ (US)

(72) Inventors: Yingze Bao, Ann Arbor, MI (US); Manmohan Chandraker, Santa Clara, CA (US); Yuanqing Lin, Sunnyvale, CA (US); Silvio Savarese, Stanford, CA (US)

(73) Assignee: NEC Corporation (JP)

( * ) Notice: Subject to any disclaimer, the term of this patent is extended or adjusted under 35 U.S.C. 154(b) by 305 days.

(21) Appl. No.: 14/073,726

(22) Filed: Nov. 6, 2013

(65) Prior Publication Data
US 2014/0132604 A1    May 15, 2014

Related U.S. Application Data

(60) Provisional application No. 61/726,041, filed on Nov. 14, 2012.

(51) Int. Cl.
G06T 17/00 (2006.01)
G06T 3/00 (2006.01)
G06T 7/00 (2006.01)

(52) U.S. Cl.
CPC .............. G06T 17/00 (2013.01); G06T 3/00 (2013.01); G06T 7/0071 (2013.01); G06T 2207/20076 (2013.01); G06T 2207/20081 (2013.01)

(58) Field of Classification Search
CPC .......... G06F 17/5095; G06K 2209/23; G06K 9/00201; G06K 9/00248; G06K 9/00281; G06K 9/3233; G06K 9/3241; G06K 9/468; G06K 9/6206; G06K 9/6209; G06K 9/621; G06K 9/6255; G06K 9/6256; G06T 17/00; G06T 17/20; G06T 19/20
See application file for complete search history.

(56) References Cited

U.S. PATENT DOCUMENTS

| | | | | |
|---|---|---|---|---|
| 7,764,817 B2* | 7/2010 | Georgescu | ............ | G06T 7/0083 382/128 |
| 8,553,989 B1* | 10/2013 | Owechko | ........... | G06K 9/00201 345/419 |
| 2002/0012454 A1* | 1/2002 | Liu | .................... | G06K 9/00201 382/118 |
| 2004/0056857 A1* | 3/2004 | Zhang | ................ | G06K 9/00268 345/419 |
| 2006/0188131 A1* | 8/2006 | Zhang | ................... | G06T 7/0044 382/103 |
| 2007/0046696 A1* | 3/2007 | Zheng | ................. | G06K 9/6206 345/646 |
| 2008/0294401 A1* | 11/2008 | Tsin | .................... | G06F 17/5095 703/8 |
| 2010/0013832 A1* | 1/2010 | Xiao | .................. | G06K 9/00248 345/420 |
| 2010/0214290 A1* | 8/2010 | Shiell | ..................... | G06K 9/621 345/420 |
| 2011/0075916 A1* | 3/2011 | Knothe | ............. | G06K 9/00201 382/154 |

OTHER PUBLICATIONS

Bao, Sid Yingze, and Silvio Savarese. "Semantic structure from motion." Computer Vision and Pattern Recognition (CVPR), 2011 IEEE Conference on. IEEE, Jun. 2011.*

* cited by examiner

Primary Examiner — Sultana M Zalalee
(74) Attorney, Agent, or Firm — Joseph Kolodka

(57) ABSTRACT

A method to reconstruct 3D model of an object includes receiving with a processor a set of training data including images of the object from various viewpoints; learning a prior comprised of a mean shape describing a commonality of shapes across a category and a set of weighted anchor points encoding similarities between instances in appearance and spatial consistency; matching anchor points across instances to enable learning a mean shape for the category; and modeling the shape of an object instance as a warped version of a category mean, along with instance-specific details.

18 Claims, 8 Drawing Sheets

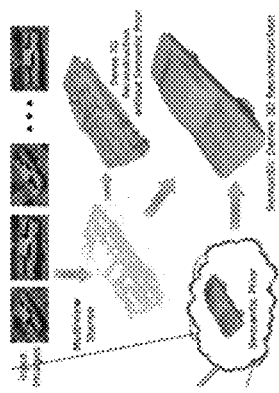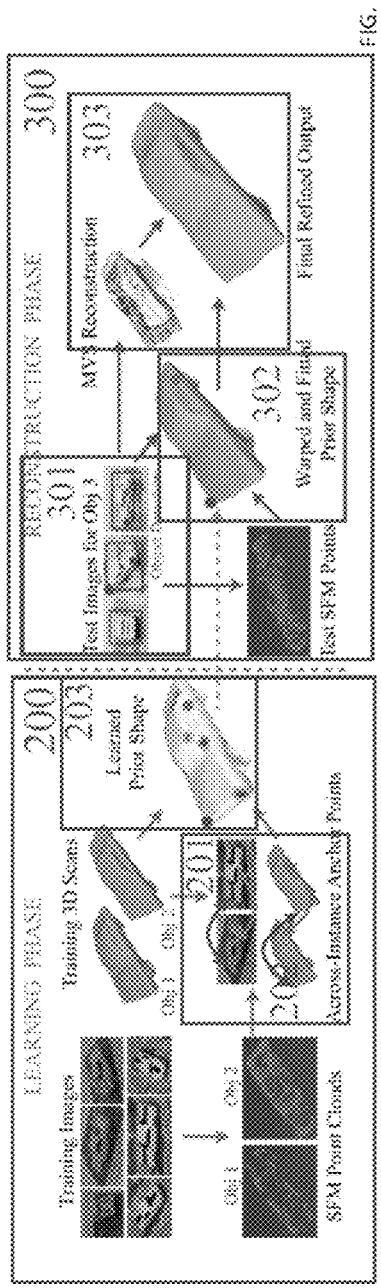
FIG. 1

A novel algorithm to robustly learn anchor points across instances with large shape variations.

---

Algorithm 1 Learning anchor points

---

Set Parameters $\delta_f$, $\delta_p$.
For objects $O^i$, $i \in [1, N]$, label $m$ points to get $M^i$.
Use $M^i$ to align $S^i_{sfm}$ with $S^i_{scan}$.
$\forall p^i_j \subset M^i$, find $A_j = \{F_{j,i}, \chi_{j,i}, \omega_j\}$ using (??), (9), (10).
Initialize $A = \{A_j\}$, $j = 1, \cdots, m$.
while anchor point set $A$ is updated do
  for $i = 1 : N$ do
    Solve $\theta = \arg\min \sum_k \|T(p^i_k, \theta) - \chi_{k,i}\|$.
    Warp SFM point cloud $S^i_{sfm} \leftarrow T(S^i_{sfm}, \theta)$.
  end for
  for all $p^i_k \in S^i_{sfm}$ do
    for all $p^j_l \in S^j_{sfm}$, where $j \neq i$ do
      if $d(f^i_k, f^j_l) < \delta_f$ and $\|p^i_k - p^j_l\| < \delta_p$ then
        Match $p^i_k$ to $p^j_l$.
      end if
    end for
  end for
  Filter conflicting matches.
  Identify sets of matched SFM points $B_h$, $h \in [1, H]$.
  for $h = 1 : H$ do
    Find $A_h = \{F_h, \chi_h, \omega_h\}$ using (??), (9), (10).
  end for
  Update $A = A \cup \{A_h\}$, for $h = 1, \cdots, H$.
end while
Output denser anchor point set $A$.

FIG. 2

A novel algorithm using model in (100) to combine different shapes into a single mean shape using anchor points.

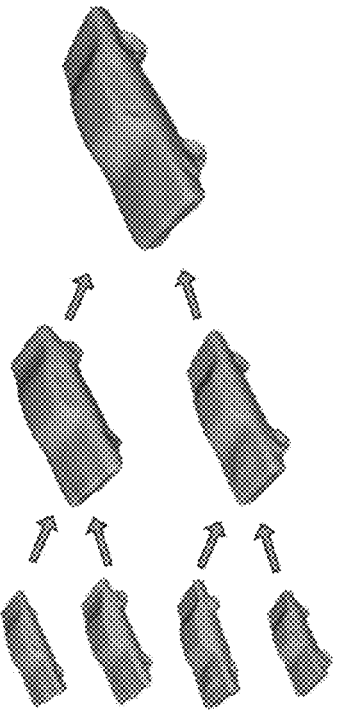

Figure 4. The mean shape computation proceeds by systematic combination of training instances, based on a binary tree traversal. The leaf nodes of the tree are the individual training instances, with assignments based on a pairwise shape similarity computation followed by hierarchical clustering. Note that unique details are lost, while features representative of the entire class are preserved.

Step 1: Find similarity between all shapes (number of common anchor points).
Step 2: Hierarchical clustering on the shape similarities.
Step 3: Arrange shapes as leaf nodes in a binary tree, based on above clustering.
Step 4: Traverse tree in order, performing
  Step 4(a): Weighted TPS transformation on anchor points
  Step 4(b): Finer refinement to bring shapes closer, using the formula:

$$\sum_{p_k^i \in P^i} e_k^i (2d_k^i - (p_k^i - p_k^j))^2 + \mu \sum_{p_k^i \in P^i} \sum_{p_l^i \in N_k^i} (d_k^i - d_l^i)^2.$$

The weights $e_k^i$ are computed by a Gaussian propagation of anchor point weights to the neighboring points.

A novel method to use object detection to secure initial alignment between learned prior shape and test reconstruction point cloud.

In image $I_j$, the detector returns the confidence value $p_j^i(u, s, \pi)$ of a detection hypothesis which appears in image location u, with scale (height and width) s and pose $\pi$. Given the estimated camera poses, a hypothesized 3D object $O$ can be projected to each image $I_j$ at location $u_j$, scale $s_j$ and pose $\pi_j$. Thereby, following [2], the object $O$ in 3D space may be estimated as $$O = \arg\max_O \sum p_j^i(u_j, s_j, \pi_j). \quad (16)$$

This allows approximate estimation of the centroid, 3D pose and scale of an object. Since we also know those for the shape prior, we can use a rigid transformation to coarsely align the prior shape and its anchor points to fit the SFM point cloud of the object.

FIG. 5

A novel algorithm to robustly match anchor points between shape prior and test reconstruction.

302

Algorithm 2 Matching anchor points

Set parameters $\delta_1, \delta_2, \eta$.
for $k = 1 : K$ (total number of iterations) do
  Initialize match set $B_k = \{\}$.
  for all $A_i = \{T_i, x_i, \omega_i\} \in \{A\}$ do
    Define $P = \{p_k \in S_{sfm} : \|p_k - x_i\| < \delta_1\}$.
    Find $p_j \in S_{sfm}$ s.t. $p_j = \arg\min_p \rho^{i,j}$ (Eq. 14).
    If $d(f_j, f_i) < \delta_2$, match $(A_i, p_j)$, $B_k = B_k \cup \{p_j\}$.
    Record 3D distance $r_i = \|x_i - p_j\|$.
  end for
  Solve $\theta'_k = \arg\min \|T(A, \theta) - B_k\|$.
  for all $A_i \in A$ do
    if $\|T(x_i, \theta'_k) - b_i\| > r_i$ then
      Discard match $(A_i, b_i)$, $B_k = B_k \setminus \{b_i\}$.
    end if
  end for
  Solve $\theta_k = \arg\min \|T(A, \theta) - B_k\|$.
  $\forall A_i \in A$, $x_i \leftarrow T(x_i)$.
  $\delta_1 \leftarrow \eta \delta_1$.
end for
Output: the set of matches $B_K$.

FIG. 6

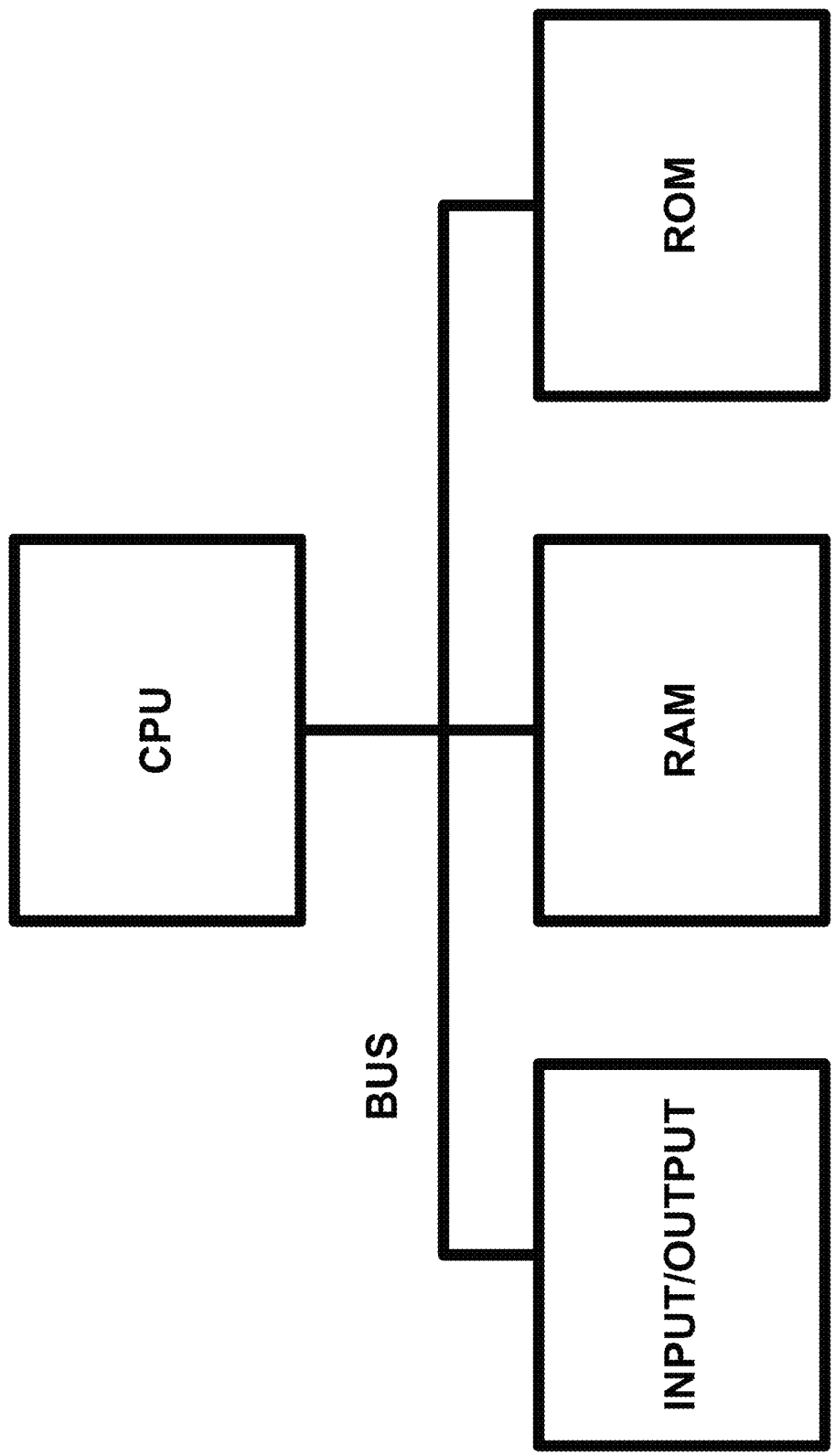

SEMANTIC DENSE 3D RECONSTRUCTION

This application is a utility conversion and claims priority to Provisional Application Ser. 61/726,041 filed Nov. 14, 2012, the content of which is incorporated by reference.

BACKGROUND

This invention relates to augmenting traditional multiview stereo (MVS) reconstruction methods with semantic information such as semantic priors.

Recent years have seen rapid strides in dense 3D shape recovery, with multiview stereo (MVS) systems capable of reconstructing entire monuments. Despite this progress, MVS has remained largely applicable only in favorable imaging conditions. Lack of texture leads to extended troughs in photoconsistency-based cost functions, while specularities violate inherent Lambertian assumptions. Diffuse photoconsistency is not a reliable metric with wide baselines in scenarios with few images, leading to sparse, noisy MVS outputs. Under these circumstances, MVS reconstructions often display holes or artifacts.

On the other hand, there have been developments in two seemingly disjoint areas of computer vision. With the advent of cheap commercial scanners and depth sensors, it is now possible to easily acquire 3D shapes. Concurrently, the performance of modern object detection algorithms has rapidly improved to allow inference of reliable bounding boxes in the presence of clutter, especially when information is shared across multiple views.

SUMMARY

In one aspect, a method to reconstruct 3D model of an object includes receiving with a processor a set of training data including images of the object from various viewpoints; learning a prior comprised of a mean shape describing a commonality of shapes across a category and a set of weighted anchor points encoding similarities between instances in appearance and spatial consistency; matching anchor points across instances to enable learning a mean shape for the category; and modeling the shape of an object instance as a warped version of a category mean, along with instance-specific details.

In another aspect, given training data comprised of 3D scans and images of objects from various viewpoints, we learn a prior comprised of a mean shape and a set of weighted anchor points. The former captures the commonality of shapes across the category, while the latter encodes similarities between instances in the form of appearance and spatial consistency. We propose robust algorithms to match anchor points across instances that enable learning a mean shape for the category, even with large shape variations across instances. We model the shape of an object instance as a warped version of the category mean, along with instance-specific details. Given multiple images of an unseen instance, we collate information from 2D object detectors to align the structure from motion point cloud with the mean shape, which is subsequently warped and refined to approach the actual shape Advantages of the preferred embodiments may include one or more of the following. The system can perform a dense reconstruction without the drawbacks of traditional multiview stereo by incorporating semantic information in the form of learned category-level shape priors and object detection. The system can perform dense reconstruction for textured surface without requiring many views. Dense reconstruction can be done with lower imaging cost (only few views required). Reconstruction can be done even for traditionally difficult surfaces, such as those without texture.

Extensive experiments demonstrate that our model is general enough to learn semantic priors for different object categories, yet powerful enough to reconstruct individual shapes with large variations. Qualitative and quantitative evaluations show that our framework can produce more accurate reconstructions than alternative state-of-the-art multiview stereo systems.

BRIEF DESCRIPTION OF THE DRAWINGS

FIG. 1 shows an exemplary system to perform Dense Object Reconstruction with Semantic Priors.

FIG. 2 shows an exemplary process for determining semantic similarity between objects (anchor points).

FIG. 4 shows an exemplary process to combine different shapes into a single mean shape using anchor points.

FIG. 5 shows an exemplary process to use object detection to secure alignment between learned shape and test reconstruction point cloud.

FIG. 6 shows an exemplary process to robustly match anchor points between shape prior and test reconstruction.

FIG. 8 shows an exemplary computer that performs the processes of FIGS. 1-7.

DESCRIPTION

FIG. 1 shows an exemplary system to perform Dense Object Reconstruction with Semantic Priors. The system provides a framework for dense 3D reconstruction that overcomes the drawbacks of traditional MVS by leveraging semantic information in the form of object detection and shape priors learned from a database of training images and 3D shapes. Our priors are general—they are category-level and learned from training data. While object instances within a category might have very different shapes and appearances, they share certain similarities at a semantic level. For example, both sedans and sports cars have bonnets and wheels. We model semantic similarity as a shape prior, which consists of a set of automatically learned anchor points across several instances, along with a learned mean shape that captures the shared commonality of the entire category. Our experiments demonstrate that this novel representation can successfully achieve the balance between capturing semantic similarities and shape variation across instances.

Our Model: Shape=Prior+Unique Details $S^i = T(S^*, \theta^i) + \Delta^i$

Transformation $T$ is a weighted thin plate spline
$(K + n\lambda W^{-1})\beta + \Phi a = x' \Phi^T \beta = 0,$ Unique details d obtained by minimizing $$\sum_{p_k^i \in P^i} \epsilon_k^i (d_k^i - (p_k^j - p_k^i))^2 + \mu \sum_{p_k^i \in S^i, p_l^i \in N_k^i} (d_k^i - d_l^i)^2$$

The process of FIG. 1 has a learning phase 200 and a reconstruction phase 300. In the learning phase, the anchor points encode attributes such as frequency, appearance and location similarity of features across instances. The associated weights aid in discarding spurious texture matches, while determining a weighted regularization for both mean shape learning and reconstruction. Based on matched anchor points, the shape prior for a category is determined by a series of weighted thin-plate spline (TPS) warps over the scans of training objects.

Our reconstruction phase starts with a point cloud obtained by applying a structure-from-motion (SFM) or MVS system to images of an unseen instance (with a shape different from training objects). Bounding boxes from object detection in individual images are collated using the SFM camera poses and used to localize and orient the object in the point cloud. This guides the process of matching anchor points—shown by green stars in right panel—between the learned prior and the test object's SFM point cloud, followed by a warping of the prior shape in order to closely resemble the true shape. Finer details not captured by the shape prior may be recovered by a refinement step, using guidance from SFM or MVS output. The refinement combines confidence scores from anchor points and photoconsistency in order to produce a regularized, high quality output shape. Not only are our reconstructions visually pleasant, they are also quantitatively closer to the ground truth than other baselines.

Figure 3:
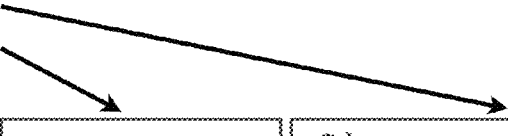
FIG. 3 shows an exemplary process to learn anchor points across instances with large shape variations.
Figure 7:
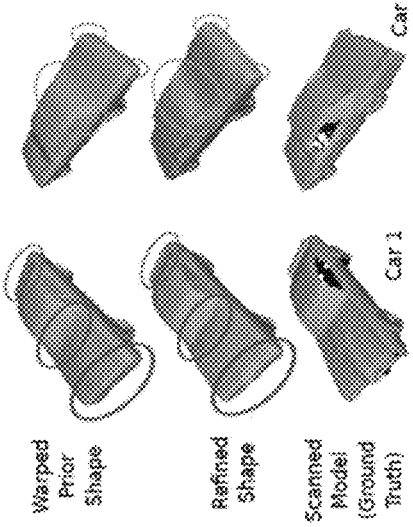
FIG. 7 shows an exemplary process to warp aligned prior shape to reconstruct SFM point cloud.

FIGS. 2-6 show in more details the implementation of FIG. 1. FIG. 2 shows an exemplary process for determining semantic similarity between objects (anchor points). FIG. 3 shows an exemplary process to learn anchor points across instances with large shape variations. FIG. 4 shows an exemplary process to combine different shapes into a single mean shape using anchor points. FIG. 5 shows an exemplary process to use object detection to secure alignment between learned shape and test reconstruction point cloud. FIG. 6 shows an exemplary process to robustly match anchor points between shape prior and test reconstruction.

We assume that for each object category, there exists a prior that consists of a 3D mean shape S* that captures the commonality of shapes across all instances and a set of anchor points A that captures similarities between subsets of instances. The shape of any particular object $S^i$ is a transformation of S*, plus specific details $\Delta^i$ not shared by other instances:

$$S^i = T(\{S^*, A\}, \theta^i) + \Delta^i, \quad (1)$$

where T is a warping (transformation) function and $\theta^i$ is the warping parameter that is unique to each object instance. In the following, we briefly explain the various aspects of our model.

One key to reconstructing an object instance is to estimate the warping parameters $\theta^i$. We leverage on certain reliable features associated with the shape prior, which we call anchor points. Anchor points form the backbone of our framework, since they are representative of object shape and the relative importance of different object structures. Anchor points with high weights, $\omega$, are considered stable in terms of location and appearance, and thus, more representative of object shape across instances. They guide the learning of the mean shape for a category, as well as the deformation processes during actual 3D reconstruction. In Section 4.1, we detail the mechanism of learning anchor points from training data.

Warping function is discussed next. We assume that the functional form of T is known. In particular, prior work on shape matching has demonstrated inspiring results using regularized thin-plate spline (TPS) transformations to capture deformations. Let $\{x_i\}$ and $\{x'_i\}$, i=1, ..., n, be two sets of anchor points for object instances O and O'. The TPS mapping T is given by $$T(x, \{\alpha, \beta\}) = \sum_{j=0}^{3} \alpha_j \phi_j(x) + \sum_{i=1}^{n} \beta_i U(x, x_i) \quad (2)$$

where $\phi_0(x)=1$, $\phi_j(x)=x_j$ and $U(x, x_i)=\|x-x_i\|$. Note that our TPS representation is in 3D, instead of the more common 2D representation in traditional shape matching. The solution for the parameters $\theta=\{\alpha,\beta\}$ in a regularized framework is given by the system of equations:

$$(K+n\lambda I)\beta + \Phi\alpha = x', \Phi^T\beta = 0 \quad (3)$$

where $K_{ij}=U(x_i,x_j)$, $\Phi_{ij}=\phi_j(x_i)$ and $\lambda$ is a regularization parameter. Regularized TPS yields a solution that interpolates between two point sets and is sufficiently smooth. However, greater control is required for 3D reconstruction applications, since the extent of deformations must be determined by the local level of detail. Semantic information of this nature is determined automatically in our framework by the anchor point learning mechanism. To incorporate semantic information from anchor points, in the form of a weight matrix $W=\text{diag}(\omega_1, \ldots, \omega_n)$, we use an extension of TPS:

$$(K+n\lambda W^{-1})\beta + \Phi\alpha = x', \Phi^T\beta = 0, \quad (4)$$

which is again solvable analytically like regularized TPS.

Details specific to each object that are not captured in the shape prior are recovered by a refinement step. This refinement is used in both mean shape learning and during reconstruction of a particular test object.

To refine a shape $S^i$ (a mesh) towards shape $S^j$, we compute displacements for vertices in $S^i$. For a vertex $p_k^i$ in $S^i$, we estimate the surface normal $n_k^i$ by a local tangent space computation. The vertex $p_k^i$ is matched to $p_k^j$ in $S^j$ if $|Pp_k^j - p_k^i P| < \tau_1$ and $|(p_k^j - p_k^i)^T n_k^i| < 1 - \tau_2$, where $\tau_1$, $\tau_2$ are predefined thresholds. Let $P^i$ be the set of vertices in $S^i$ that can be matched as above to the set $P^j$ in $S^j$ and $N_k^i$ be the set of 1-nearest neighbors of $p_k^i$ in $P^i$. Then, the set of displacements, $\Delta^i = \{d_k^i\}$, for $1 \leq k \leq |P^i|$, are computed by minimizing:

$$\sum_{p_k^i \in P^i} \varepsilon_k^i (d_k^i - (p_k^j - p_k^i))^2 + \mu \sum_{p_k^i \in S^i} \sum_{p_l^i \in N_k^i} (d_k^i - d_l^i)^2 \quad (5)$$

where $\varepsilon_k^i$ is a weight factor. The above cost function encourages the refined shape to lie closer to $S^j$, while minimizing the local distortion induced by such displacement. The parameter $\mu$ is empirically determined for the training set. Note that (5) represents an extremely sparse linear system that can be solved efficiently. The vertices of the refined shape are obtained as $p_k^i + d_k^i$ and it inherits the connectivity of $S^i$.

Learning Reconstruction Priors is discussed next. For each object category, we use a set of object instances $\{O^n\}$ to learn a mean shape S* and a set of anchor points A. For each object instance $O^i$ in this training set, we capture a set of images $I^i$ and use a 3D scanner to obtain a detailed 3D shape $S_{scan}^i$. Given $I^i$, we use a standard SFM pipeline to reconstruct a point cloud $S_{sfm}^i = \{p_j^i\}$, where $p_j^i$ is a 3D point. We manually label a small number of SFM points, $M^i = \{p_1^i, p_2^i, \ldots, p_m^i\}$. The labelled points M are used to align the scanned shapes $\{S_{scan}^i\}$ and their reconstructed point clouds $\{S_{sfm}^i\}$ in our training dataset. They also serve as the initialization for the anchor point learning, as described in the following.

An anchor point, $A=\{\Gamma, \chi, \omega\}$, consists of a feature vector $\Gamma$ that describes appearance, the 3D location $\chi$ with respect to the mean shape and a scalar weight $\omega$. $\Gamma$ is the aggregation of HOG features in all images where $A$ is visible and of every object where $A$ exists. For an anchor point $A$, if $V$ are the indices of objects across which the corresponding SFM points are matched and $\Omega^i$ are the indices of images of $O^i$ where $A$ is visible, the corresponding feature vector is:

$$\Gamma=\{\{f_{k^i}^j\}_{k^i \in \Omega^i}\}_{i \in V}. \quad (6)$$

where $f_{k^i}^j$ is the HOG feature of the image point associated with $A$ in image $I_{k^i}^j$. Let $p_j^i$ be the locations of the corresponding 3D points, normalized with respect to object centroid and scale. Then, the location for the anchor point is $$\chi_j = \frac{1}{|V|} \sum_{i \in V} p_j^i. \quad (7)$$

The weight $\omega$ reflects "importance" of an anchor point. We consider an anchor point important if it appears across many instances, with low position and appearance variance. That is, $$\omega = w_x w_a w_f \quad (8)$$

where $$w_x = \exp\left(-\frac{\sum_{i \neq k} P p^j - p^k P}{\sigma_x N_2}\right),$$

$$w_a = \exp\left(-\frac{\sum_{i \neq k} d^{i,k}}{\sigma_a N_2}\right)$$

and $w_f = \log |V|$ encode location stability, appearance similarity and instance frequency, respectively. $N_2$ is the number of combinations. The coefficients $\sigma_a$ and $\sigma_x$ are determined empirically from training data for each category. In the above, $$d^{i,k} = \min_{i^i \in \Omega^i, i^k \in \Omega^k} (|f_{i^i}^j - f_{i^k}^k|), \quad (9)$$

for $i \neq k,$ where $\Omega^i$ is the set of images of $O^i$ where the point is visible.

In contrast to applications like shape matching, the quality of dense reconstruction is greatly affected by the order and extent of deformations. Thus, the learned anchor point weights $\omega$ are crucial to the success of dense reconstruction. Note that while ASM frameworks also associate a weight with landmark points, they are computed solely based on location uncertainty. By encoding appearance similarity and instance frequency, we impart greater semantic knowledge to our reconstruction stage.

The key precursor to learning anchor points is matching 3D points across instances, which is far from trivial. Besides within-class variation, another challenge is the fact that most SFM points correspond to texture. Such points usually dominate an SFM point cloud, but do not generalize across instances since they do not correspond to the object shape, thus, may not be anchor point candidates. Moreover, the density of anchor points cannot be too low, since they guide the deformation process that computes the mean shape and fits it to the 3D point cloud. To ensure the robustness of anchor point matching and good density, an iterative process is shown below:

A novel algorithm to robustly learn anchor points across instances with large shape variations.

---

Algorithm 1 Learning anchor points

Set Parameters $\delta_f$, $\delta_p$.
For objects $O^i$, $i \in [1, N]$, label m points to get $M^i$.
Use $M^i$ to align $S_{sfm}^i$ with $S_{scan}^i$.
$\forall p_j^i \subset M^i$, find $A_j = \{\Gamma_j, \chi_j, \omega_j\}$ using (8), (9), (10).
Initialize $A = \{A_j\}$, $j = 1, \ldots, m$.
while anchor point set A is updated do
  for $i = 1 : N$ do
    Solve $\theta = \arg\min \Sigma_k \|T(p_k^i, \theta) - \chi_k\|$.
    Warp SFM point cloud $S_{sfm}^i \leftarrow T(S_{sfm}^i, \theta)$.
  end for
  for all $p_k^i \in S_{sfm}^i$ do
    for all $p_l^j \in S_{sfm}^j$, where $j \neq i$ do
      if $d(f_k^i, f_l^j) < \delta_f$ and $\|p_k^i - p_l^j\| < \delta_p$ then
        Match $p_k^i$ to $p_l^j$.
      end if
    end for
  end for
  Filter conflicting matches.
  Identify sets of matched SFM points $B_h$, $h \in [1, H]$.
  for $h = 1 : H$ do
    Find $A_h = \{\Gamma_h, \chi_h, \omega_h\}$ using (8), (9), (10).
  end for
  Update $A = A \cup \{A_h\}$, for $h = 1, \ldots, H$.
end while
Output: denser anchor point set A.

---

Mean Shape Construction is discussed next. The learned anchor points are used to compute a mean shape for an object category. Recall that we have a mapping from the set of anchor points to each instance in the training set. Thus, we can warp successive shapes closer to a mean shape using the anchor points. The mean shape is constructed by combining these aligned and warped shapes of different instances. Since there are multiple shape instances, the order of combining them is a critical design issue, because improperly combining dissimilar shapes may introduce severe artifacts. To determine the order for combining shapes, we first measure the pairwise similarity between all pairs of training instances. In our experiments, we use the weighted number of commonly matched anchor points as the similarity cue. Given the pairwise similarities, we use hierarchical clustering to group the shapes. The similarity relationships can be represented as a binary tree where each leaf node is an object. We combine the warped shapes) $T(S_{scan}^i)$ following the order of merging successive branches, to eventually obtain a single shape $S^*$, which represents the commonality of all training instances. We use $S^*$ as the mean shape. The mean shape learning procedure is shown for a subset of the car dataset in FIG. 6. Note that $S^*$ is computed by using the warped training examples, where the warping maps the 3D locations of learned anchor points. Thus, the prior shape is always aligned with the anchor points.

In the above, the warp $T(S_{scan}^i) \rightarrow S_{scan}^j$, with $i < j$ according to the above defined ordering, is computed as the weighted thin plate spline transformation given by (4). Two shapes aligned by anchor points are eventually combined into a single one using displacement vectors computed by minimizing (5).

The mean shape computation proceeds by systematic combination of training instances, based on a binary tree traversal. The leaf nodes of the tree are the individual training instances, with assignments based on a pairwise shape similarity computation followed by hierarchical clustering. Note that unique details are lost, while features representative of the entire class are preserved.

Semantic Reconstruction with Shape Priors is discussed next. Given a number of images of an object O, we can reconstruct its 3D shape by warping the learned prior shape S* based on the estimated θ and by recovering Δ in (1) subsequently. The reconstruction consists of three steps: matching anchor points, warping by anchor points, and refinement. Accurately recovering warp parameters θ requires accurate matches between anchor points in S* and SFM points in $S_{sfm}$. This is facilitated by an initial coarse alignment between S* and $S_{sfm}$.

Multiple images are used to significantly improve detection accuracy in both image and 3D space. In image $I_j$, the detector returns the confidence value $p_i(u,s,\pi)$ of a detection hypothesis which appears in image location u, with scale (height and width) s and pose π. Given the estimated camera poses, a hypothesized 3D object O can be projected to each image $I_j$ at location $u_j$, scale $s_j$ and pose $\pi_j$. Thereby, the object O in 3D space may be estimated as $$O = \underset{O}{\text{argmax}} \sum p_j(u_j, s_j, \pi_j). \quad (10)$$

This allows approximate estimation of the centroid, 3D pose and scale of an object. Since we also know those for the shape prior, we can use a rigid transformation to coarsely align the prior shape and its anchor points to fit the SFM point cloud of the object.

Reconstruction is discussed next. Given a set of images I of an object with unknown shape S, we use standard SFM to recover the 3D point cloud $S_{sfm}$. Our goal is to use the mean shape S* to produce a dense reconstruction that closely resembles S.

Next is the Matching Anchor Points. Since the initial alignment uses the object's location, pose and scale, anchor points are likely to be aligned to 3D locations in the vicinity of their true matches. Thus, the burden of identifying the point in $S_{sfm}$ that corresponds to an anchor point in S* is reduced to a local search. We use HOG features to match anchor points to SFM points.

A novel algorithm to robustly match anchor points between shape prior and test reconstruction.

---
Algorithm 2 Matching anchor points
---

Set parameters $\delta_1$ $\delta_2$ η.
for k = 1 : K (total number of iterations) do
  Initialize match set $B_k$ = { }.
  for all $A_i = \{T_i, \chi_i, \omega_i\} \in \{A\}$ do
    Define P = $\{p_k \in S_{sfm} : ||p_k - \chi_i|| < \delta_1\}$.
    Find $p_j \in S_{sfm}$ s.t. $p_j = \arg\min_P d^{i,j}$ (Eq. 11)
    If $d(f_j, f_i) < \delta_2$, match $(A_i, p_j)$, $B_k = B_k \cup \{p_j\}$.
    Record 3D distance $r_i = ||\chi_i - p_j||$.
  end for
  Solve $\theta'_k$ = arg min$||T(A,\theta) - B_k||$.
  for all $A_i \in A$ do
    if $||T(\chi_i, \theta'_k) - b_i|| > r_i$ then
      Discard match $(A_i, b_i)$, $B_k = B_k \setminus \{b_i\}$.
    end if
  end for
  Solve $\theta_k$ = arg min$||T(A,\theta) - B_k||$.

---
Algorithm 2 Matching anchor points
---

$\forall A_i \in A, \chi_i \leftarrow T(\chi_i)$.
    $\delta_1 \leftarrow \eta \delta_1$.
  end for
  Output: the set of matches $B_K$.

---

Warping Based on Anchor Points is detailed next. Assume S* is the shape prior after the initial alignment of Section 5.1. We use the above matches between anchor points in S* and SFM points in $S_{sfm}$ to estimate parameters θ for the weighted TPS warping (4) and obtain S'=T(S*,θ) that further approaches the actual shape. Notice that, this warping not only reduces the alignment error from the initial detection-based alignment, it also deforms the prior to fit the actual shape of the object.

The final step in the reconstruction process is to recover the unique details of the object. These unique details cannot be learned a priori, so they may not be captured by the warped shape S'. We use the output of an MVS algorithm, $S_{mvs}$, to supply these details. While MVS may have several missing regions and outliers for the object we consider, it may reconstruct accurate oriented patches in textured or Lambertian regions where diffuse photoconsistency is a reliable metric. Using the refinement process governed by (5), we move the vertices of S' closer to $S_{mvs}$. The weights $\epsilon_k$ now incorporate the confidence in the corresponding matched MVS point, which is encoded by the normalized cross-correlation photoconsistency.

The inventors contemplate that fine-grained recognition and detection of object parts may also benefit our semantic reconstruction framework. The system can work in an MRF-based MVS framework like, since it provides the flexibility to combine our shape prior with silhouette information from object detectors.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

By way of example, a block diagram of a computer to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method to reconstruct 3D model of an object with a structure-from-motion (SFM) processor, the method comprising:
   receiving with the processor a set of training data including images of the object captured by a camera from various viewpoints;
   learning a prior comprised of a mean shape describing a commonality of shapes across a category and a set of weighted anchor points encoding similarities between instances in appearance and spatial consistency;
   matching anchor points across instances to enable learning a mean shape for the category;
   applying the structure-from-motion (SFM) processor to images of an unseen instance with a shape different from training objects to generate a point cloud;
   collating bounding boxes from object detection in individual images using the SFM camera poses and localizing and orienting one or more objects in the point cloud;
   modeling the shape of an object instance as a warped version of a category mean, along with instance-specific details;
   recovering each object not in a shape prior with a set of displacements and reconstructing an object instance by estimating the warping parameters and modeling semantic similarity as the shape prior with a set of automatically learned anchor points across several instances and a learned mean shape that captures shared commonality between semantic similarities and shape variation across instances; and
   determining a set of displacement $\Delta^i=\{d_k^i\}$, for $1 \leq k \leq |P^i|$ by minimizing:

$$\sum_{p_k^i \in P^i} \varepsilon_k^i (d_k^i - (p_k^j - p_k^i))^2 + \mu \sum_{p_k^i \in S^i} \sum_{p_l^i \in N_k^i} (d_k^i - d_l^i)^2$$

Where i and j are points, parameter $\mu$ is empirically determined for the training set, $\varepsilon_k^i$ is a weight factor, $P^i$ is set of vertices in shape $S^i$ matched to a set $P^j$ in shape $S^j$ and $N_k^i$ be a set of 1-nearest neighbors of $p_k^i$ in $P^i$.

2. The method of claim 1, comprising receiving multiple images of an unseen instance, and collating information from 2D object detectors to align the structure from motion point cloud with the mean shape, which is subsequently warped and refined to approach the shape.

3. The method of claim 1, comprising representing shape prior as anchor points and mean shape.

4. The method of claim 1, comprising representing anchor point weights.

5. The method of claim 1, comprising determining warping and refining the object.

6. The method of claim 1, comprising applying object detection to localize a region of interest in a point cloud.

7. The method of claim 1, comprising learning semantic information to relate shapes in a training database.

8. The method of claim 1, comprising learning semantic matching anchor points and their weights to capture this semantic information and discard superficial information.

9. The method of claim 1, comprising learning semantic of a mean prior shape that captures the commonality of shapes in a category.

10. The method of claim 1, comprising performing warping and refining shapes to match a point cloud.

11. The method of claim 1, comprising performing object detection to align prior shapes to point clouds.

12. The method of claim 1, comprising generating a shape representation that treats a shape as a warped prior with unique details.

13. The method of claim 1, comprising determining a 3D mean shape S* that captures the commonality of shapes across all instances and a set of anchor points A that captures similarities between subsets of instances with a shape of any particular object $S^i$ being a transformation of S*, plus specific details $\Delta^i$ not shared by other instances:

$$S^i = T(\{S^*, A\}, \theta^i) + \Delta^i,$$

where T is a warping (transformation) function and $\theta^i$ is the warping parameter that is unique to each object instance.

14. The method of claim 1, comprising using regularized thin-plate spline (TPS) transformations to capture deformations with $\{x_i\}$ and $\{x'_i\}$, i=1, ... n, be two sets of anchor points for object instances O and O'.

15. A system to reconstruct 3D model of an object, comprising a structure-from-motion (SFM) code, a processor, and code for:
   receiving with a processor a set of training data including images of the object from various viewpoints;
   learning a prior comprised of a mean shape describing a commonality of shapes across a category and a set of weighted anchor points encoding similarities between instances in appearance and spatial consistency;
   matching anchor points across instances to enable learning a mean shape for the category;
   applying the structure-from-motion (SFM) code to images of an unseen instance with a shape different from training objects to generate a point cloud;
   collating bounding boxes from object detection in individual images using the SFM camera poses and localizing and orienting one or more objects in the point cloud;
   modeling the shape of an object instance as a warped version of a category mean, along with instance-specific details;
   recovering each object not in a shape prior with a set of displacements and reconstructing an object instance by estimating the warping parameters and modeling semantic similarity as the shape prior with a set of automatically learned anchor points across several instances and a learned mean shape that captures shared commonality between semantic similarities and shape variation across instances; and determining a set of displacement $\Delta^i = \{d_k^i\}$, for $1 \leq k \leq |P^i|$ by minimizing:

$$\sum_{p_k^i \in P^i} \varepsilon_k^i (d_k^i - (p_k^j - p_k^i))^2 + \mu \sum_{p_k^i \in S^i} \sum_{p_l^j \in N_k^i} (d_k^i - d_l^j)^2$$

Where i and j are points, parameter $\mu$ is empirically determined for the training set, $\epsilon_k^i$ is a weight factor, $P^i$ is set of vertices in shape $S^i$ matched to a set $P^j$ in shape $S^j$ and $N_k^i$ be a set of 1-nearest neighbors of $p_k^i$ in $P^i$.

16. The system of claim 15, comprising code for receiving multiple images of an unseen instance, and collating information from 2D object detectors to align the structure from motion point cloud with the mean shape, which is subsequently warped and refined to approach the shape.

17. The system of claim 15, comprising code for representing shape prior as anchor points and mean shape.

18. The system of claim 15, comprising code for representing anchor point weights.

* * * * *